US010163294B2

(12) United States Patent
Castro et al.

(10) Patent No.: US 10,163,294 B2
(45) Date of Patent: *Dec. 25, 2018

(54) GAMING TERMINAL WITH AN INCLINED INPUT INTERFACE

(71) Applicant: Bally Gaming, Inc., Las Vegas, NV (US)

(72) Inventors: Christian Louis Castro, Chicago, IL (US); Joel Roger Jaffe, Glenview, IL (US); Paul Michael Lesley, Chicago, IL (US); Larry J. Pacey, Calabasas, CA (US); Jesse M. Smith, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,995

(22) Filed: Oct. 25, 2017

(65) Prior Publication Data

US 2018/0047246 A1 Feb. 15, 2018

Related U.S. Application Data

(63) Continuation of application No. 15/135,204, filed on Apr. 21, 2016, now Pat. No. 9,858,747, which is a
(Continued)

(51) Int. Cl.
*A63F 9/24* (2006.01)
*A63F 13/00* (2014.01)
(Continued)

(52) U.S. Cl.
CPC ...... *G07F 17/3209* (2013.01); *G07F 17/3211* (2013.01); *G07F 17/3216* (2013.01)

(58) Field of Classification Search
USPC .................. 463/16, 20, 25, 30, 31; 273/139
See application file for complete search history.

(56) References Cited

U.S. PATENT DOCUMENTS 4,588,187 A 5/1986 Dell et al.
5,214,414 A 5/1993 Levine et al.
(Continued)

FOREIGN PATENT DOCUMENTS

GB 2238388 A 5/1991
WO 1996022580 A1 7/1996
(Continued)

*Primary Examiner* — Adetokunbo O Torimiro
(74) *Attorney, Agent, or Firm* — David J. Bremer

(57) ABSTRACT

A gaming terminal includes a first display screen operative to display a wagering game that includes a lower section. A second display screen is operative to display images of input buttons and includes a touchscreen operative to receive inputs at the input buttons to play the wagering game. The second display screen is smaller than the first display screen. The second display screen is positioned forwardly relative to the lower section of the first display screen such that the second display screen is closer than the first display screen to a player position in front of the gaming terminal. The second display screen is inclined relative to horizontal such that an imaginary plane containing the second display screen intersects the lower section of the first display screen thereby creating an infinity pool effect when viewing the first display screen relative to the second display screen.

20 Claims, 14 Drawing Sheets

Related U.S. Application Data continuation of application No. 14/454,428, filed on Aug. 7, 2014, now Pat. No. 9,349,240.

(60) Provisional application No. 61/880,234, filed on Sep. 20, 2013.

(51) Int. Cl.

| | |
|---|---|
| ***G06F 17/00*** | (2006.01) |
| ***G06F 19/00*** | (2018.01) |
| ***G07F 17/32*** | (2006.01) |

(56) References Cited

U.S. PATENT DOCUMENTS

| | | | | |
|---|---|---|---|---|
| 5,327,161 | A | 7/1994 | Logan et al. | |
| 5,496,977 | A | 3/1996 | Date et al. | |
| 5,543,591 | A | 8/1996 | Gillespie et al. | |
| 5,636,839 | A | 6/1997 | Oda | |
| 5,739,814 | A | 4/1998 | Ohara et al. | |
| 5,886,697 | A | 3/1999 | Naughton et al. | |
| 5,963,199 | A | 10/1999 | Kato et al. | |
| 5,967,898 | A | 10/1999 | Takasaka et al. | |
| 5,995,106 | A | 11/1999 | Naughton et al. | |
| 6,005,545 | A | 12/1999 | Nishida et al. | |
| 6,020,881 | A | 2/2000 | Naughton et al. | |
| 6,154,209 | A | 11/2000 | Naughton et al. | |
| 6,160,551 | A | 12/2000 | Naughton et al. | |
| 6,244,960 | B1 | 6/2001 | Takasaka et al. | |
| 6,319,126 | B1 | 11/2001 | Tamaki | |
| 6,323,846 | B1 | 11/2001 | Westerman et al. | |
| 6,454,649 | B1 | 9/2002 | Mattice et al. | |
| 6,471,588 | B2 | 10/2002 | Sakamoto | |
| 6,517,433 | B2 | 2/2003 | Loose et al. | |
| 6,620,044 | B1 | 9/2003 | Okada | |
| 6,626,761 | B1 | 9/2003 | Okada | |
| 6,659,867 | B1 | 12/2003 | Kodachi et al. | |
| 6,672,962 | B1 | 1/2004 | Ozaki et al. | |
| 6,695,697 | B1 | 2/2004 | Okada | |
| 6,699,122 | B1 | 3/2004 | Osawa | |
| 6,857,958 | B2 | 2/2005 | Osawa | |
| 7,066,813 | B1 | 6/2006 | Sakamoto et al. | |
| 7,097,560 | B2 | 8/2006 | Okada | |
| 7,159,865 | B2 | 1/2007 | Okada | |
| 7,281,980 | B2 | 10/2007 | Okada | |
| 7,294,059 | B2 | 11/2007 | Silva et al. | |
| 7,322,883 | B2 | 1/2008 | Toyoda | |
| 7,338,363 | B2 | 3/2008 | Okada | |
| 7,355,660 | B2 | 4/2008 | Ikeda | |
| 7,390,259 | B2 | 6/2008 | Okada | |
| 7,409,513 | B2 | 8/2008 | Tanimura | |
| 7,413,512 | B2 | 8/2008 | Mattice et al. | |
| 7,462,798 | B2 | 12/2008 | Okada et al. | |
| 7,479,061 | B2 | 1/2009 | Okada | |
| 7,562,872 | B2 | 7/2009 | Okada | |
| 7,618,323 | B2 | 11/2009 | Rothschild et al. | |
| D605,231 | S | 12/2009 | Hashimoto et al. | |
| 7,628,701 | B2 | 12/2009 | Wells | |
| D622,782 | S | 8/2010 | Chudek et al. | |
| 7,780,515 | B2 | 8/2010 | Okada | |
| 7,892,096 | B2 | 2/2011 | Rigsby et al. | |
| 8,016,655 | B2 | 9/2011 | Sato | |
| 8,057,303 | B2 | 11/2011 | Rasmussen et al. | |
| 8,087,986 | B2 | 1/2012 | Yoshizawa | |
| 8,113,945 | B2 | 2/2012 | Yoshizawa | |
| 8,123,603 | B2 | 2/2012 | Yoshizawa | |
| 8,123,615 | B2 | 2/2012 | Okada | |
| 8,137,192 | B2 | 3/2012 | Thomas | |
| 8,152,614 | B2 | 4/2012 | Yoshizawa | |
| 8,182,344 | B2 | 5/2012 | Bleich et al. | |
| 8,216,046 | B2 | 7/2012 | Ikeya et al. | |
| 8,226,459 | B2 | 7/2012 | Barrett et al. | |
| 8,262,480 | B2 | 9/2012 | Cohen et al. | |
| 8,308,561 | B2 | 11/2012 | Mattice et al. | |
| 8,371,923 | B1 | 2/2013 | Iremonger et al. | |
| 8,408,991 | B2 | 4/2013 | Gilmore | |
| 8,460,103 | B2 | 6/2013 | Mattice et al. | |
| 8,475,271 | B2 | 7/2013 | Okada | |
| 8,535,141 | B2 | 9/2013 | Rommerdahl et al. | |
| 8,702,497 | B2 | 4/2014 | Chudek et al. | |
| 8,734,232 | B2 | 5/2014 | Bunch et al. | |
| 8,734,248 | B2 | 5/2014 | Greenberg et al. | |
| 8,834,259 | B2 * | 9/2014 | Rommerdahl | G07F 17/3209 463/16 |
| 2004/0166937 | A1 | 8/2004 | Rothschild et al. | |
| 2006/0166728 | A1 | 7/2006 | Cornell et al. | |
| 2006/0178205 | A1 | 8/2006 | Bleich et al. | |
| 2007/0207861 | A1 * | 9/2007 | Gawel | G07F 17/32 463/46 |
| 2009/0181769 | A1 | 7/2009 | Thomas et al. | |
| 2009/0275406 | A1 | 11/2009 | Bytnar et al. | |
| 2010/0124962 | A1 | 5/2010 | Chudek et al. | |
| 2010/0291992 | A1 | 11/2010 | Greenberg et al. | |
| 2011/0165932 | A1 | 7/2011 | Rommerdahl et al. | |
| 2012/0122553 | A1 | 5/2012 | Bunch et al. | |
| 2013/0079157 | A1 | 3/2013 | Chudek et al. | |
| 2013/0157751 | A1 | 6/2013 | Loose et al. | |
| 2013/0217491 | A1 | 8/2013 | Hilbert et al. | |

FOREIGN PATENT DOCUMENTS

| | | | |
|---|---|---|---|
| WO | 1996022581 | A1 | 7/1996 |
| WO | 1997032641 | A1 | 9/1997 |
| WO | 1998029854 | A1 | 7/1998 |
| WO | 1998033568 | A1 | 8/1998 |
| WO | 1999058214 | A1 | 11/1999 |
| WO | 2000003407 | A1 | 1/2000 |
| WO | 2000056414 | A1 | 9/2000 |
| WO | 2007127258 | A2 | 11/2007 |
| WO | 2008045464 | A2 | 4/2008 |

* cited by examiner

GAMING TERMINAL WITH AN INCLINED INPUT INTERFACE

CROSS-REFERENCE TO RELATED APPLICATIONS

This application is a continuation of U.S. patent application Ser. No. 15/135,204, filed Apr. 21, 2016, which is a continuation of U.S. patent application Ser. No. 14/454,428, filed Aug. 7, 2014, now U.S. Pat. No. 9,349,240, issued on May 24, 2016, which claims priority to and the benefits of U.S. Patent Application No. 61/880,234, filed Sep. 20, 2013, all of which are hereby incorporated by reference herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to an inclined input interface for a gaming terminal.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to some aspects of the invention, a gaming terminal comprises a first display screen operative to display a wagering game. The first display screen includes a lower section. A second display screen is operative to display images of input buttons. The second display screen includes a touchscreen operative to receive inputs at the input buttons to play the wagering game. The second display screen is smaller than the first display screen. The second display screen is positioned forwardly relative to the lower section of the first display screen such that the second display screen is closer than the first display screen to a player position in front of the gaming terminal. The second display screen is inclined relative to horizontal such that an imaginary plane containing the second display screen intersects the lower section of the first display screen, thereby creating an infinity-pool effect when viewing the first display screen relative to the second display screen.

According to another aspect of the invention, a gaming system includes a first display device for displaying a wagering game. The first display device defines a first imaginary plane. A second display device has a frontal viewing area of height, H, for displaying images associated with the wagering game. The second display device includes a touchscreen for receiving inputs associated with the wagering game. The second display device is smaller than the first display device. The second display device defines a second imaginary plane that intersects with the first imaginary plane within a lower section of the frontal viewing area of the first display device and forms an obtuse angle therewith. A top edge of the second display device is horizontally offset from a bottom edge of the first display device. The horizontal offset distance is in the range of 0.85 H to 1.15 H.

According to yet another aspect of the invention, a method of operating a gaming terminal includes displaying a wagering game on a first display screen that is operative to display a wagering game. The first display screen includes a lower section. Images of input buttons are displayed on a second display screen. The second display screen includes a touchscreen operative to receive inputs at the input buttons to play the wagering game. The second display screen is smaller than the first display screen. The second display screen is positioned forwardly relative to the lower section of the first display screen such that the second display screen is closer than the first display screen to a player position in front of the gaming terminal. The second display screen is inclined relative to horizontal such that an imaginary plane containing the second display screen intersects the lower section of the first display screen, thereby creating an infinity-pool effect when viewing the first display screen relative to the second display screen.

Additional aspects of the invention will be apparent to those of ordinary skill in the art in view of the detailed description of various embodiments, which is made with reference to the drawings, a brief description of which is provided below.

Figure 1:
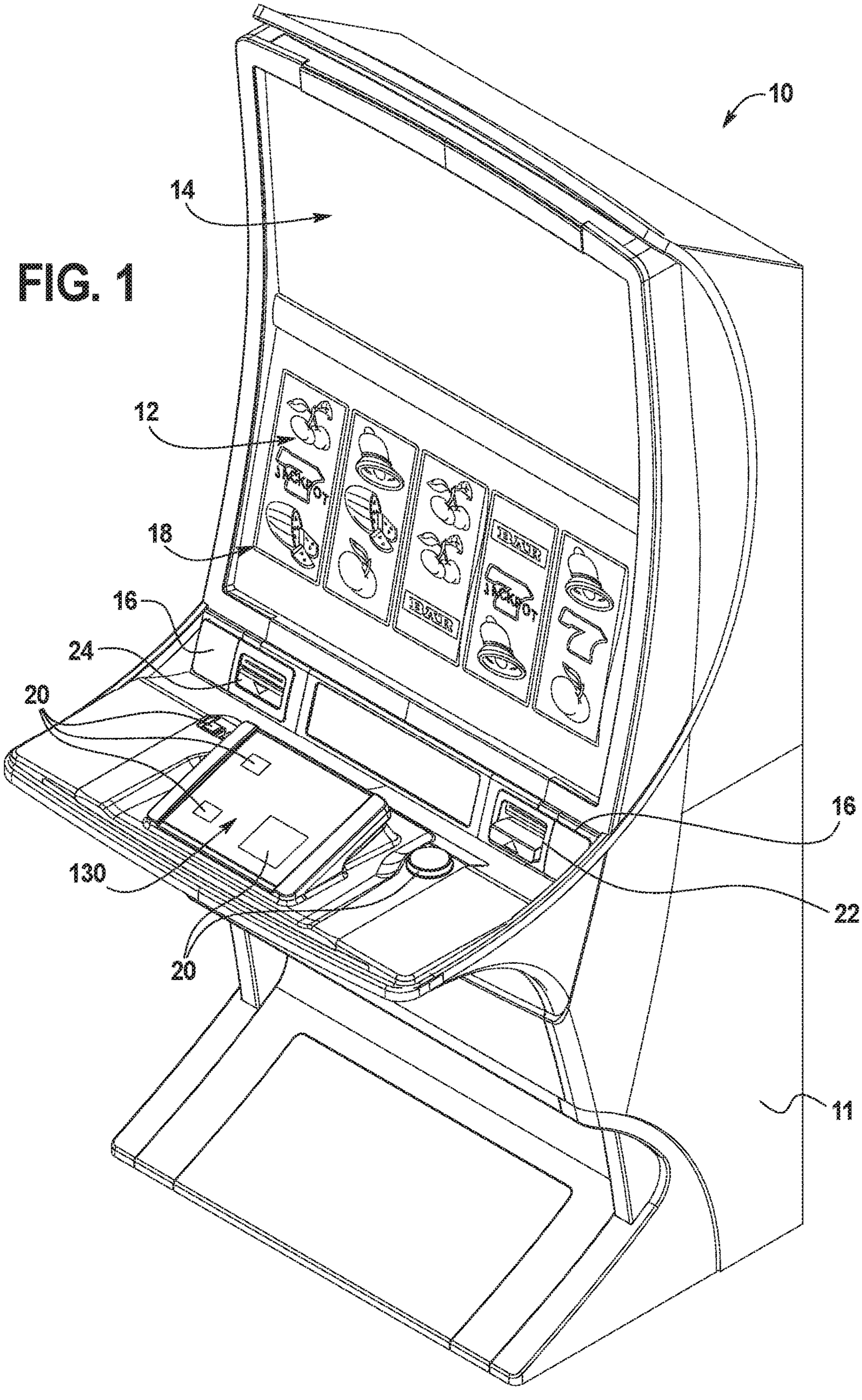
FIG. 1 is a perspective view of a free-standing gaming terminal according to at least some aspects of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 that may include select feature of other gaming terminals and may have varying structures and methods of operation. For example, in some aspects, the gaming terminal 10 may include electromechanical aspects, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, bartop models, workstation-type console models, etc. Further, the gaming terminal 10 may be primarily dedicated for use in conducting wagering games. Exemplary types of gaming terminals are disclosed in U.S. Pat. No. 6,517,433, titled "Reel Spinning Slot Machine With Superimposed Video Image," U.S. Patent Application Publication Nos. US2010/0069160, titled "Handheld Wagering Game Machine And Docking Unit," and US2010/0234099, titled "Wagering Game System With Docking Stations" which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, an inclined touchscreen display area 130, a secondary display area 14, and one or more audio speakers 16. The primary display area 12 or the secondary display area 14 may be a video display, or a combination of a mechanical reel display and a video display in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. In addition to the inclined touchscreen display 130, the gaming terminal 10 can also include a touch screen(s) 18 mounted over the primary or secondary areas, a bill validator 22, and information reader/writer(s) 24. The gaming terminal 10 can also include player-accessible port(s) (e.g., audio output jack for headphones, video headset jack, USB port, wireless transmitter/receiver, etc.) (not shown). Furthermore, in addition to the inclined touchscreen display area 130, the gaming terminal 10 can also include buttons 20 on a button panel or on the touchscreen display area 130. It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device (e.g., inclined touchscreen display area 130), a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
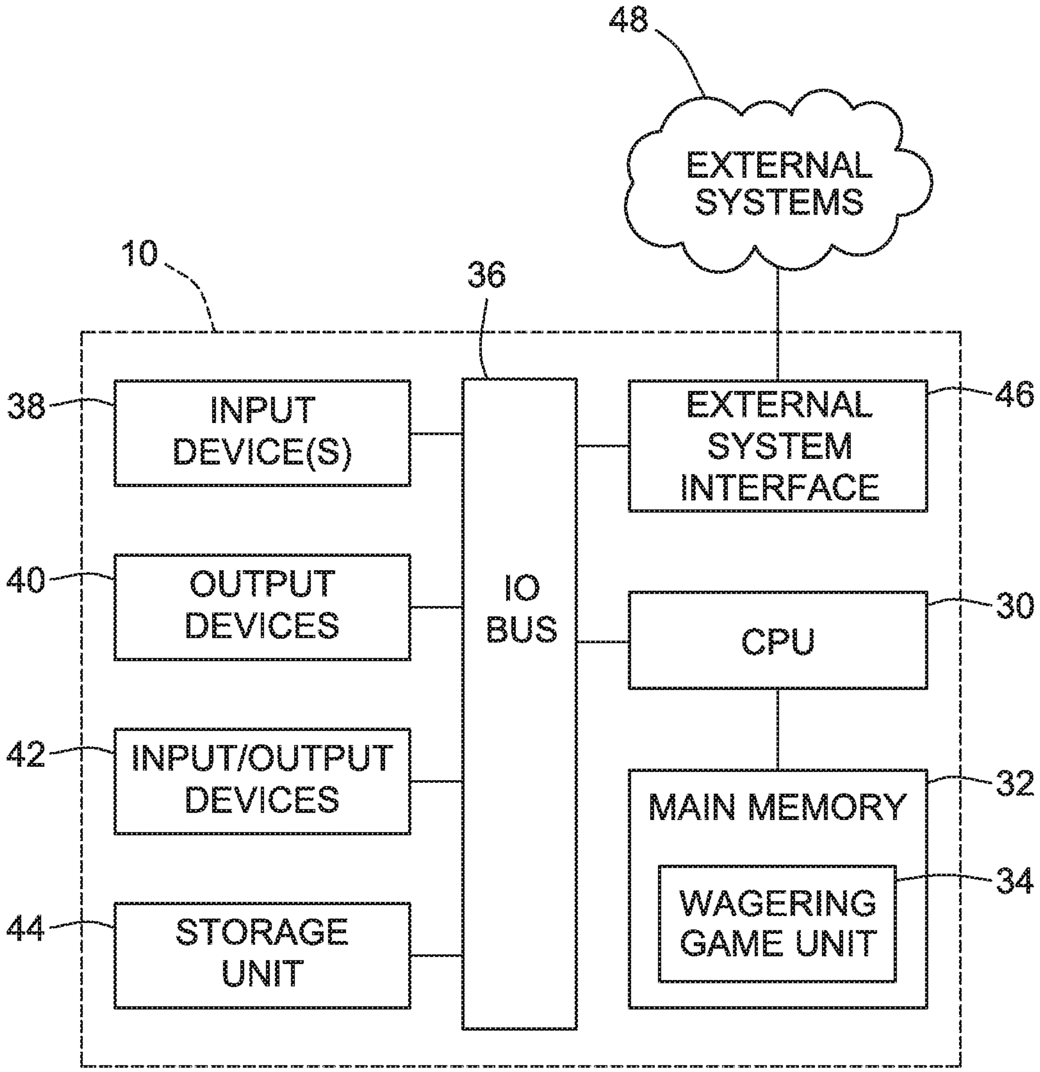
FIG. 2 is a schematic view of a gaming system according to at least some aspects of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video blackjack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
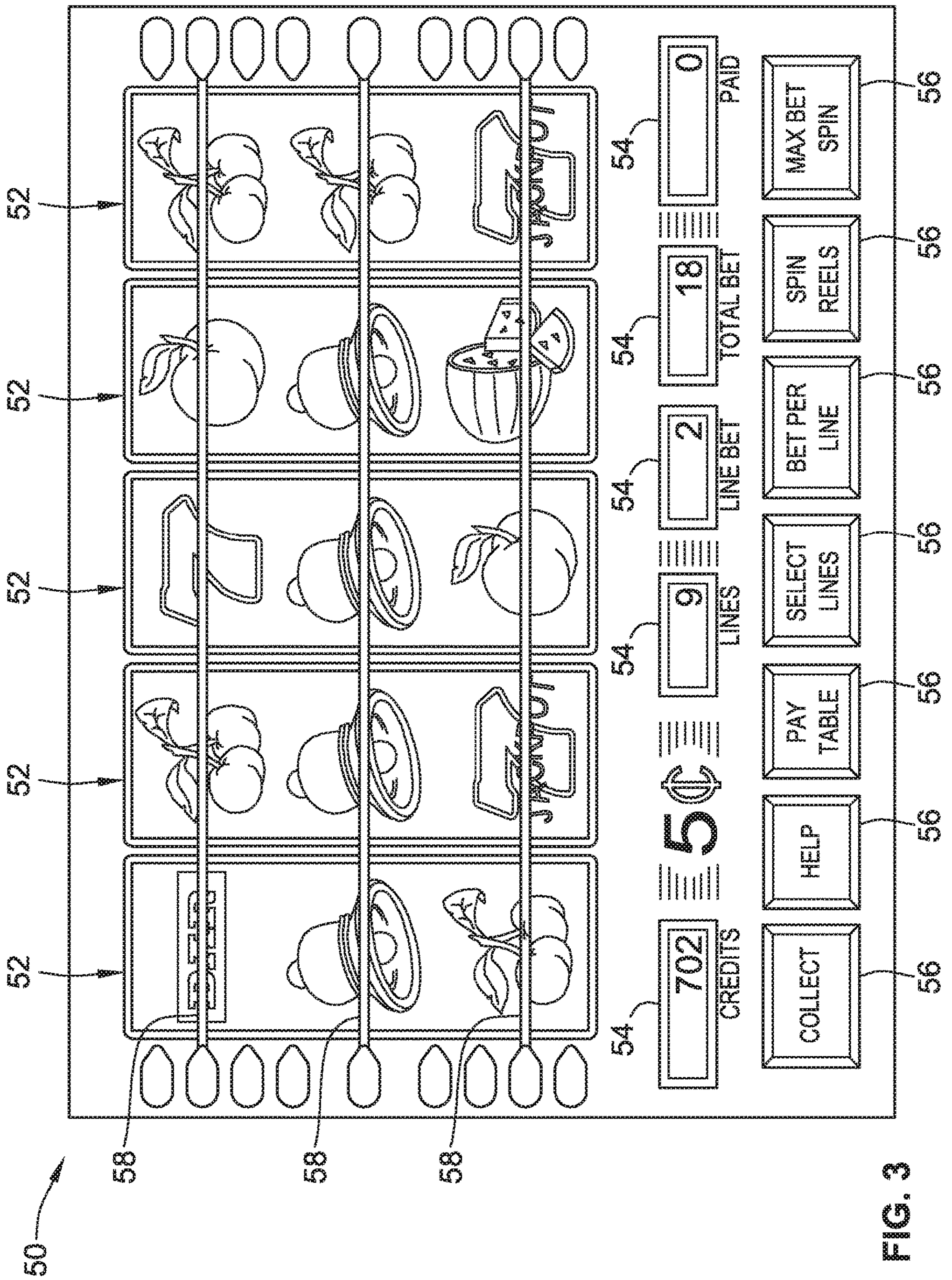
FIG. 3 is an image of an exemplary basic-game screen of a wagering game displayed on a gaming terminal according to at least some aspects of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12, secondary display 14, inclined touchscreen display 130) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

It is contemplated that an improved input interface would be desirable for a gaming terminal 10, such as a an touchscreen-type display (e.g., an inclined touchscreen display) that is smaller than a primary display screen and that allows virtual content to be moved from the touchscreen display (e.g., a tablet, inclined touchscreen display) to a main or primary display screen. The touchscreen display is furthermore coordinated with the game content presented on the primary display screen. For example, some of the game content can be displayed on both the smaller touchscreen display and the primary display screen. The input interface can also desirably include other features to customize a player's experience and reduce player fatigue by promoting optimal body positioning. It is also contemplated that the larger primary display screen can also include a touchscreen.

In some aspects, a gaming terminal 10 includes an inclined touchscreen display and a primary display screen, such as a main video display, where the spacing between the two screens is coordinated and the screens are oriented (e.g., see FIGS. 4-9, 11, and 12) to provide an infinity-pool effect (e.g., see FIGS. 11 and 12) to a player playing at the gaming terminal 10. For example, the orientation and spacing between the inclined touchscreen display and the primary display screen along with the sizing of the two screens creates a visual wall on the gaming terminal that provides or gives an appearance to a player of an infinity-pool effect. The distal edge (e.g., the edge farthest from the player) of the inclined touchscreen display is positioned to appear slightly below a lower edge (e.g., as measured vertically from horizontal) of the primary display screen. The visual effect of displayed features on the gaming terminal is of the feature appearing to vanish toward a horizon (e.g., at the distal edge) on the inclined touchscreen display. In some aspects, the infinity-pool effect created by the arrangement of an inclined touchscreen display and a primary display screen produces a visual appearance of a zero edge (e.g., the appearance of no apparent top edge on the distal end of the inclined touchscreen display) while presenting proximal images (e.g., closer to the player) on the inclined touchscreen display within a player's field of vision.

In some aspects, an infinity-pool effect at a gaming terminal is accomplished according to the relative position of an inclined display screen (e.g., input interface, tablet, inclined touchscreen display) to a primary display screen (e.g., main display screen). It is a desirable feature for a rear or distal edge (e.g., the upper edge that is highest in elevation) of the inclined display screen to appear higher than the bottom or lower edge of the primary display screen—though, both edges may be at the same height or the distal edge of the inclined display screen may even be lower than the lower edge of the primary display screen when determined relative to the same vertical reference point. Thus, while reference is made to an appearance of being higher, the true dimensionality may indicate the rear edge of the inclined display screen is or is not higher than the lower or bottom edge of the primary display screen though the rear or distal edge of the inclined input screen is positioned to provide the appearance to a player of being higher.

Figure 4:
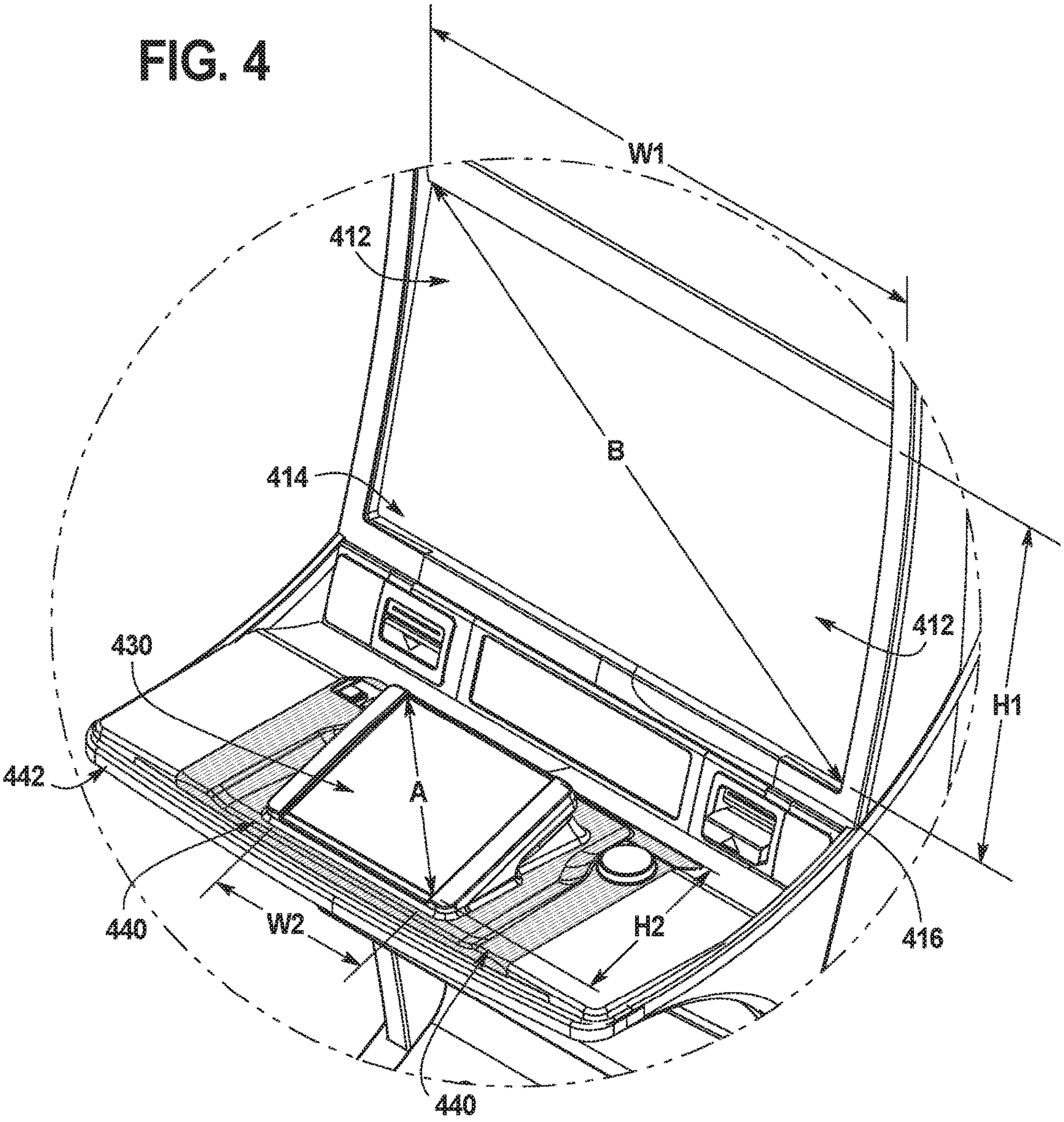
FIG. 4 is a perspective view of an exemplary inclined touchscreen display and primary display screen for a free-standing gaming terminal according to at least some aspects of the present invention.

Referring now to FIG. 4, a perspective view of an exemplary inclined touchscreen display 430 and an exemplary primary display screen 412 for a free-standing gaming terminal, such as the one described for FIG. 1, is illustrated. The gaming terminal includes a primary or main display screen 412, and an input touchscreen display 430 positioned forwardly of the primary display screen to be closer to where a player of the gaming terminal would be positioned. As illustrated in FIG. 4, the inclined touchscreen display 430 is smaller than the primary display screen 412 and is positioned forwardly of a lower section 414 of the primary display screen 412. The touchscreen display 430 is also positioned at an incline relative to horizontal and may be connected to or rest on the top of a frontal ledge 442. The primary display screen 412 and the inclined touchscreen display 430 are arranged such that an infinity-pool effect is created when viewing the primary display screen 412 relative to the input touchscreen display 430.

The frontal ledge 442 may include the hatched region 440 along with the portions to the left and right of the hatched region 440 spanning the width of the cabinet. In some aspects, the frontal ledge 442 is connected to or extending from the cabinet of the gaming terminal. The hatched region 440 may be an integral part of the frontal ledge 442. In some aspects, the hatch region 440 can also be a separate unit attached to or connected to the frontal ledge 442. It is also contemplated that the hatched region 440 may be another type of frontal ledge that is connected to or mounted to the cabinet but not spanning the width of the cabinet (e.g., not including the portions to the left and right of the hatched region in FIG. 4). For example, the hatched region 440 may define an alternate frontal ledge to which the inclined touchscreen display is secured, removably or with limited translation options, and where this alternate frontal ledge may protrude from the main cabinet sub-assembly that supported the primary display screen.

It is contemplated that the frontal ledge 442 (or alternate hatched region 440 on its own) may be desirable in some aspects of the gaming terminal illustrated in FIG. 4. However, in some aspects an inclined touchscreen display can be hung or otherwise loosely attached to the front of the cabinet of the gaming terminal without mounting the touchscreen display to a ledge. The front ledge is positioned below the height, relative to a vertical benchmark, of a lower edge 416 of the primary display screen 412. While frontal ledge is illustrated as being a part of the cabinet of the gaming terminal in FIG. 4, it is also contemplated that the cabinet portion that houses the primary display screen can also extend to form the frontal ledge.

In some aspects of a gaming terminal, the inclined touchscreen display 430 has a diagonal dimension, A, of 12.1 inches or less and the primary display screen 412 has a diagonal dimension B of 21.5 inches or more. In some aspects, the viewable surface area of the inclined touchscreen display 430 has height and width dimensions generally expressed as H2 (e.g., height) and W2 (e.g., width) and the primary display screen 412 has height and width dimensions expressed as H1 (e.g., height) and W1 (e.g., width). In some aspects, the viewable surface area of an inclined touchscreen display is 71 square inches or less based on rectangular dimensions of approximately 7.3 inches or less (H2) by 9.7 inches or less (W2) and the viewable surface area of a primary display screen is 198 square inches or more based on rectangular dimensions of approximately 10.6 inches or more (H1) by 18.8 inches or more (W1).

In some aspects of the gaming terminal, it is desirable to have an inclined touchscreen display 430 that has a viewing screen surface area that is less than or equal to forty percent of the viewable screen surface area of the primary display screen 412. Other desirable aspects of the gaming terminal include the diagonal dimension, A, of the inclined touchscreen display 430 being less than or equal to half of the diagonal dimension, B, of the primary display screen. These relationships can be particularly desirable for the creation of the infinity-pool effect discussed elsewhere in this disclosure.

Figure 5:
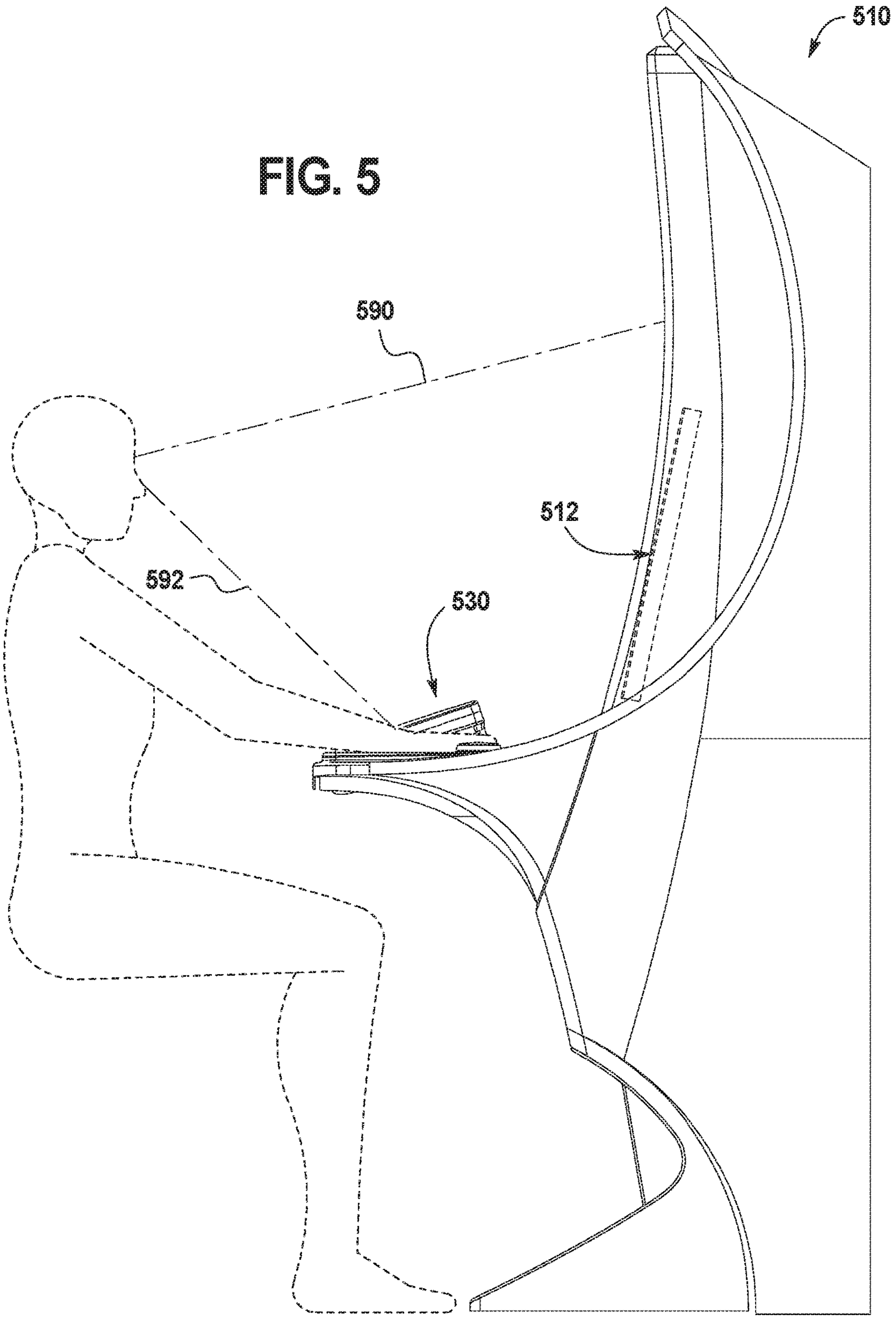
FIG. 5 is a side-section view of an exemplary free-standing gaming terminal including an inclined input display and primary display screen according to at least some aspects of the present invention.

Referring now to FIG. 5, a side-section view of an exemplary free-standing gaming terminal 510 is illustrated that includes an inclined touchscreen display 530 and primary display screen 512. FIG. 5 illustrates an exemplary field of vision defined by an upper range boundary 590 and a lower range boundary 592. A desirable aspect of the present disclosure is that both the inclined touchscreen display 530 and the primary display screen 512 are both in a player's field of vision during play of the wagering game. By providing such an arrangement, the infinity-pool effect between the touchscreen display 530 and primary display screen 512 can be created and provide a desirable gaming experience for the player.

The creation of the desired effect between the touchscreen display 530 and the primary display screen 512 depends on the eye-level position of a player in front of the gaming terminal display components. A desirable aspect in the arrangement of the inclined touchscreen display 530 can be for the upper edge to appear to the player to be above the lower edge of the primary display screen 512. While the distance of the inclined touchscreen display 530 from the front edge of the cabinet (e.g., from the front of the frontal ledge) and the height of the inclined touchscreen display 530 are factors to consider in creating an infinity-pool effect between the touchscreen and primary display screen, the angle of incline of the input touchscreen display 530 can have a more direct impact on creating the effect. These aspects are discussed in more detail with respect to FIGS. 6 and 7.

Figure 6A:
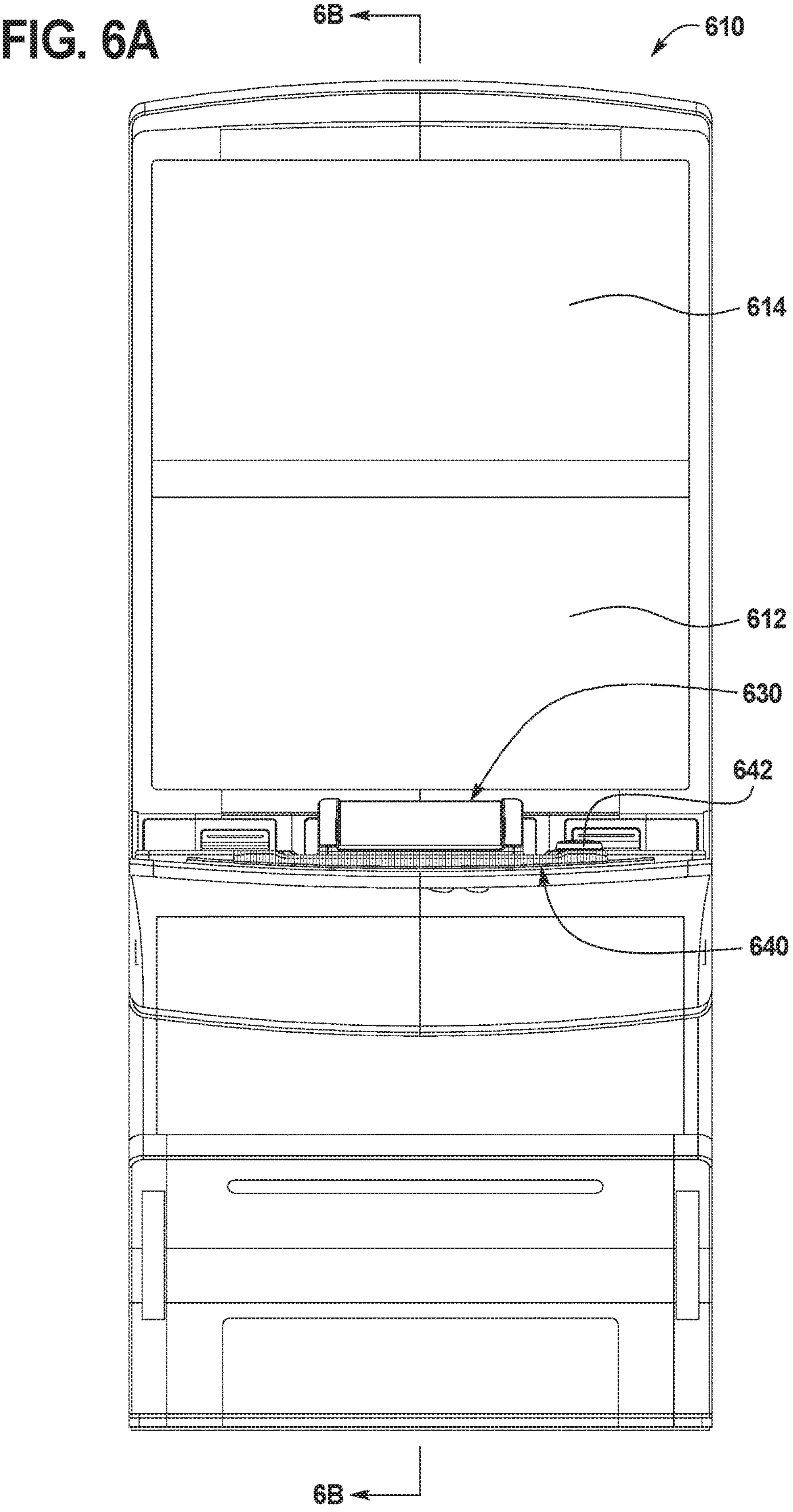
FIGS. 6A-6B are front and side-section views of an exemplary free-standing gaming terminal according to at least some aspects of the present invention.
Figure 6B:
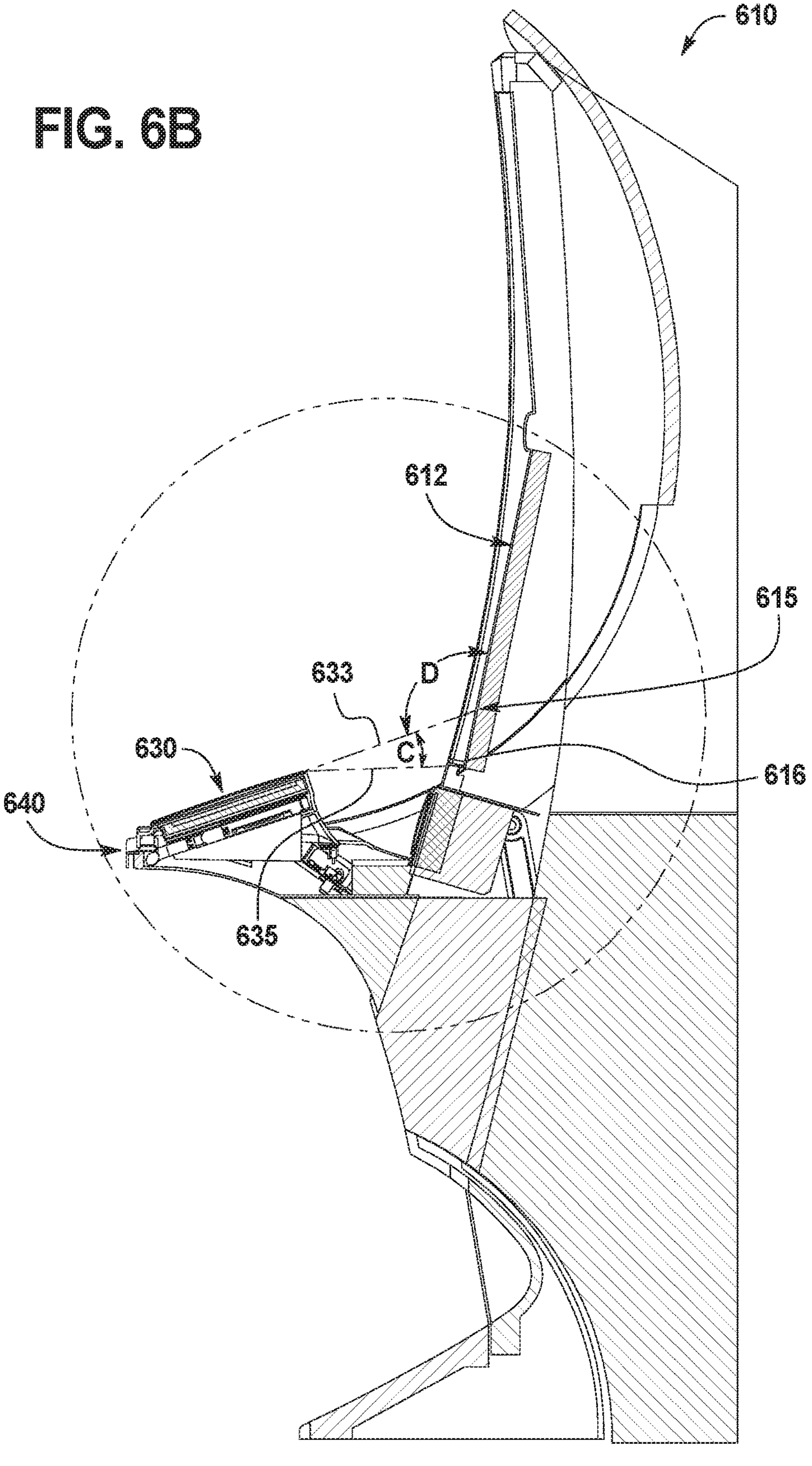
Figure 7:
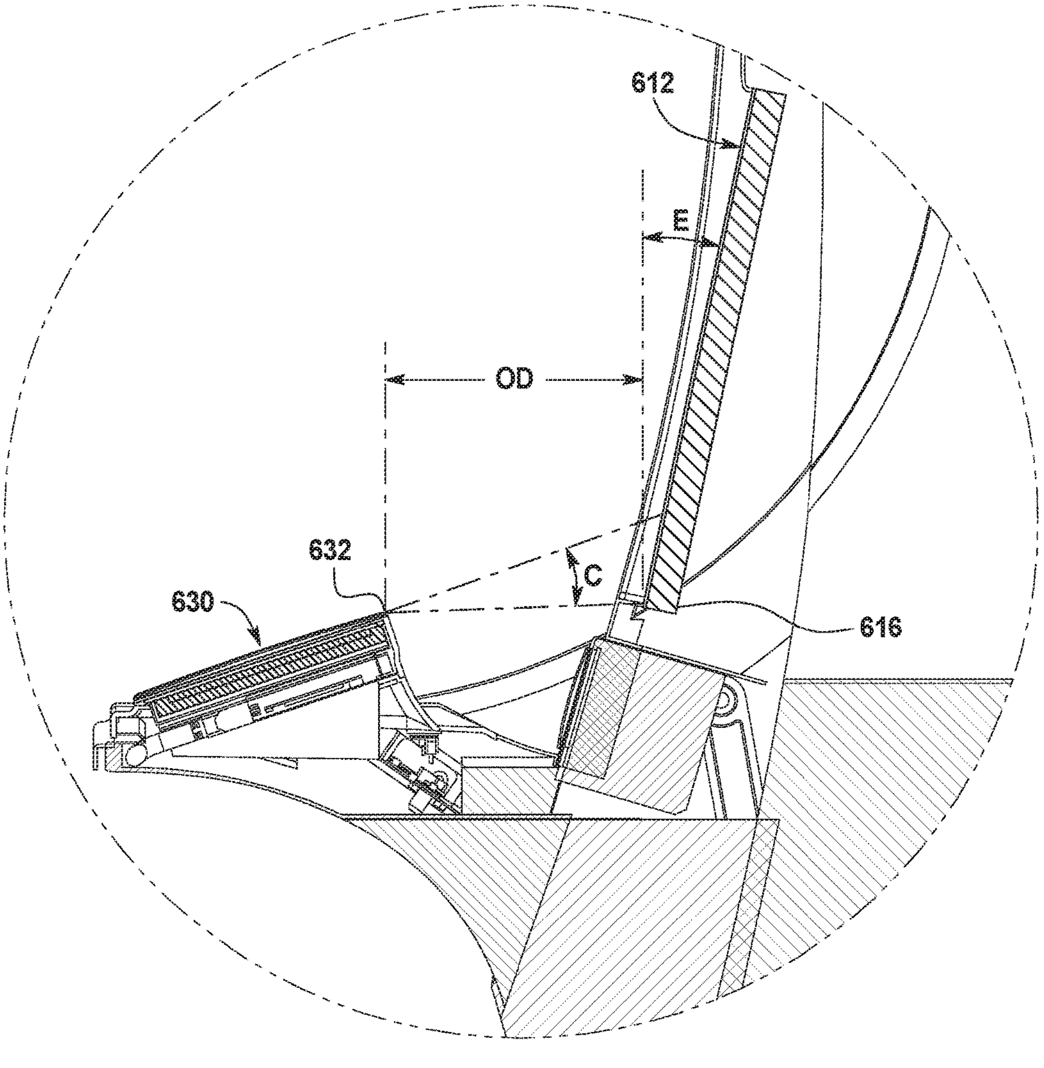
FIG. 7 is a detailed side-section view of an exemplary arrangement for an inclined input display and primary display screen according to at least some aspects of the present invention.

Turning now to FIGS. 6A-6B and 7, front and side-section views of an exemplary free-standing gaming terminal 610 are illustrated. The gaming terminal includes a secondary top display 614, a primary display screen 612, and a secondary inclined touchscreen display 630 sitting atop a frontal ledge 640. While the gaming terminal includes a touchscreen display 630 that can display images of input buttons, additional electro-mechanical push buttons (e.g., input button 642) can also be mounted to the frontal ledge 640.

The primary display screen 612 includes a lower section 615 and a lower edge 616. A desirable arrangement for the inclined touchscreen display is for it to be inclined relative to horizontal (e.g., dimension line 635) such that an imaginary plane 633 containing the top surface of the inclined touchscreen display 630 intersects the lower section 615 of the primary display screen 612. Another desirable arrangement for the gaming terminal is illustrated in FIG. 6B with the frontal ledge 640 being positioned below the height (relative to the horizontal identified by dimension line 635) of the lower edge 616 of the primary display screen 612.

In some aspects of the screen arrangements of the present disclosure, the viewing surface of a primary display screen (e.g., 612) is at an obtuse angle, D, relative to the viewing surface of the inclined touchscreen display 630. The obtuse angle, D, can be in the range of 99 to 140 degrees. It is also contemplated that the obtuse angle, D, can be in the range of 104 to 130 degrees. In certain aspects, the obtuse angle, D, is at least 104 degrees. In some aspects, the obtuse angle, D, is approximately 120 degrees.

It is further contemplated that in certain arrangements of the screens, the front viewing surface of the primary display screen 612 is tilted back away from the player about its lower edge 616 at an angle, E (see FIG. 7). In certain aspects, angle E is in the range of 0 to 10 degrees relative to vertical. The inclined touchscreen display 630 is also inclined upward from horizontal about its proximal edge (e.g., the edge closest to the player) at an angle, C (see FIGS. 6B and 7), which in certain aspects is in the range of 9 to 40 degrees. In certain aspects, the angle, C, is in the range of 14 to 30 degrees. It is further contemplated that the angle, C, can be at least 15 degrees. In certain aspects, the angle, C, is approximately 20 degrees.

In some aspects of the screen arrangements of the present disclosure, the inclined touchscreen display maybe set back so that there is approximately one to two inches from the front edge of the frontal ledge of the cabinet to the front or proximal edge of the touchscreen display. The angle of incline (e.g., angle C) of the touchscreen display can be in the range from approximately 14 to 30 degrees where the smaller the touchscreen display (e.g., 8-inch diagonal) the greater the incline angle and the larger the touchscreen display (e.g., 10.5-inch diagonal) the smaller the incline angle. Furthermore, the closer the touchscreen is positioned to the user, a lower incline angle would be preferred for there to be a desirable relationship between the touchscreen display 630 and the primary display screen 612. Similarly, the closer the touchscreen display 630 is to the primary display 612, the greater an angle of incline would be preferred to have a more desirable relationship between the two screens (e.g., screens 612, 630).

It is contemplated that the angle and position of the touch screen display is adjusted or balanced to create the infinity pool effect and to allow nominal size players to have visibility and access to the player tracking features of the gaming terminal. The arrangement of inclined touchscreen displays (e.g., 430, 530, 630) relative to primary display screen (e.g., 412, 512, 612), such as those illustrated in FIGS. 4-12, include looking at the relative elevation, angles of the screens relative to vertical or horizontal, and the orientation of the screens. The arrangement of the screens provides a unique presentation for features such as a virtual object transfer feature or infinity-pool effects for a wagering game. In certain aspects, the primary display screen may be oriented in a wide-aspect ratio with the screen positioned for viewing by the player in a landscape mode—however, the display area on the screen may be truncated to only show a portrait mode rather than the intended landscape mode. The visual impact on the player through a field of vision encompassing both screens can have a greater impact on creating an infinity-pool effect.

It is also contemplated that additional factors can describe a relationship for a gaming system regarding the positioning of the primary display screen (e.g., 412, 512, 612) relative to the inclined touchscreen display (e.g., 430, 530, 630). A first display device (e.g., primary display screen 612) can define a first imaginary plane that includes the viewing surface of the first display device. A second display device (e.g., inclined touchscreen display 630) can have a frontal viewing area of height, H (e.g., height dimension H2 in FIG.

4), for displaying images associated with the wagering game. The second display device (e.g., inclined touchscreen display 630) is smaller than the first display device (e.g., primary display screen 612). The second display device defines a second imaginary plane that includes the viewing surface of the second display device. The second imaginary plane intersects with the first imaginary plane within a lower section of the frontal viewing area of the first display device (e.g., 612) and forms an obtuse angle (e.g., angle D) therewith. A top edge (e.g., 632) of the second display device (e.g., 630) is horizontally offset from a bottom edge (e.g., 616) of the first display device (e.g., 612). In some aspects, the horizontal offset distance, OD (see FIG. 7), is proportional to the height of the viewing area of the second display device, H (e.g., also illustrated by the height dimension H2 in FIG. 4). The horizontal offset distance, OD, can be in the range of approximately 0.85 H to 1.15 H (i.e., approximately 85 percent to 115 percent of the height of the frontal viewing area of the second display device). In some aspects, the horizontal offset distance. OD, is in the range of approximately 0.95 H to 1.05 H. In yet other aspects, the horizontal offset distance, OD, is approximately equal to H or the height of the second display device.

It is contemplated that there are other desirable relationships between the first display device (e.g., primary display screen 612) and the second display device (e.g., inclined touchscreen display 630). The first display device may have a frontal viewing area of height, h (e.g., height H1 in FIG. 4), for displaying images associated with the wagering game. In some aspects, the horizontal offset distance, OD, is proportional to a height of the viewing area of the first display device, h (e.g., also illustrated by the height dimension H1 in FIG. 4). In some aspects, the horizontal offset distance, OD, is in the range of approximately 0.55 h to 0.70 h (i.e., approximately 55 percent to 70 percent of the height of the frontal viewing area of the first display device) where the height of the first display device is less than the width (e.g., the first display device is in the landscape configuration relative to the player). In some aspects, the horizontal offset distance, OD, is in the range of approximately 0.60 h to 0.65 h also where the height of the first display device is less than the width. In yet other aspects, the horizontal offset distance, OD, is at least 0.55 h or at least 0.60 h, also where the height of the first display device is less than the width. It is further contemplated that in some aspects the horizontal offset distance, OD, is approximately 0.63 h, again where the height of the first display device is less than the width (e.g., landscape configuration or landscape mode). In some aspects, the primary display screen has a wide aspect ratio of approximately 16:9.

Other desirable relationships between the first display device (e.g., primary display screen 612) and the second display device (e.g., inclined touchscreen display 630) are also described for the first display device with a frontal viewing area of height, h (e.g., height H1 in FIG. 4). In some aspects, the horizontal offset distance, OD, is in the range of approximately 0.25 h to 0.35 h (i.e., approximately 25 percent to 35 percent of the height of the frontal viewing area of the first display device) where the height of the first display device is greater than the width (e.g., the first display device is in the portrait configuration relative to the player). In some aspects, the horizontal offset distance, OD, is at least 0.25 h or at least 0.30 h where the height of the first display device is greater than the width. It is further contemplate that in some aspects the horizontal offset distance, OD, is approximately 0.30 h where the height of the first display device is greater than the width (e.g., portrait configuration or portrait mode).

Figure 8:
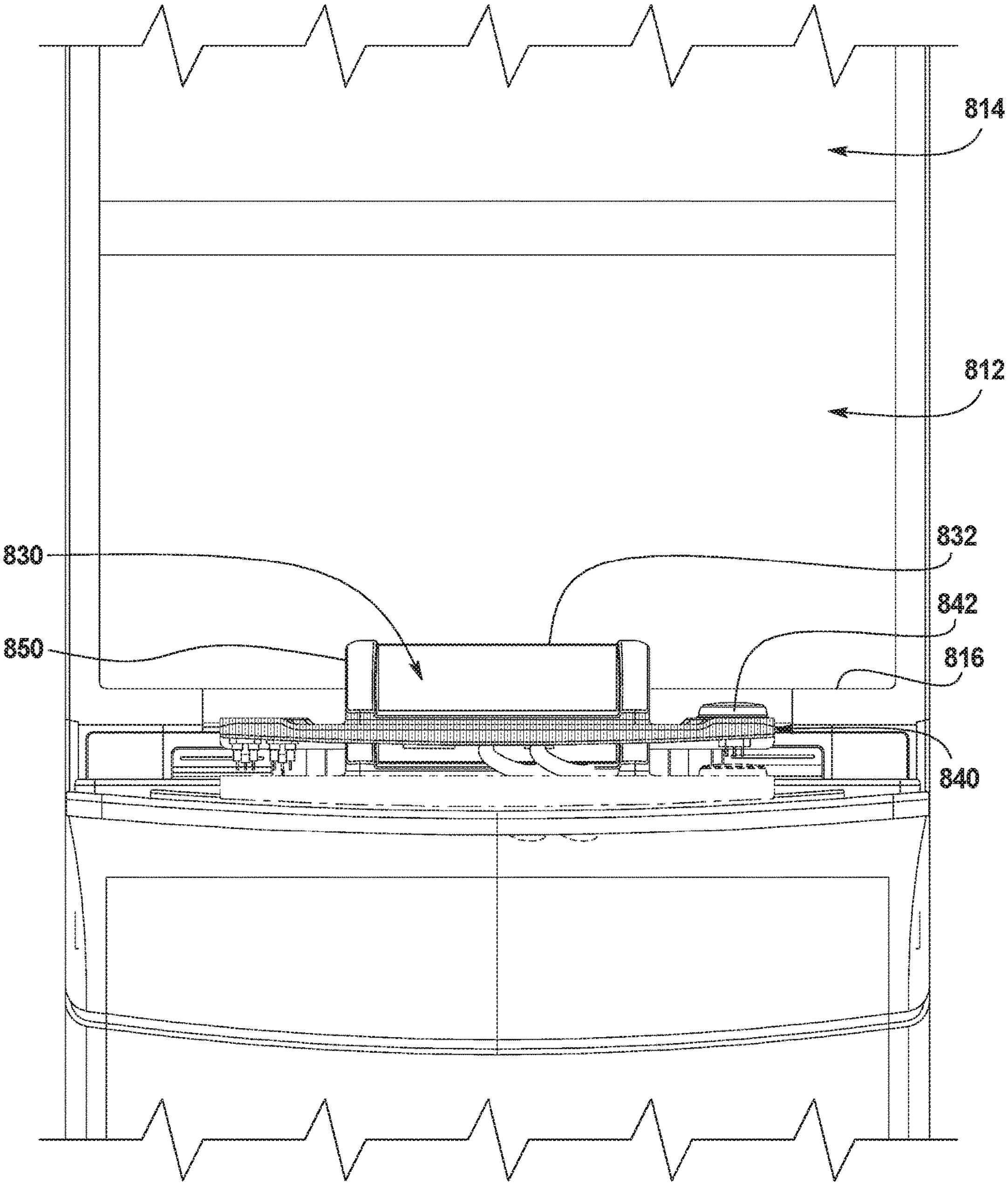
FIG. 8 is a front view of an exemplary arrangement for an inclined input display and primary display screen according to an aspect of the present invention.

Referring now to FIG. 8, a front view of an exemplary arrangement for an inclined touchscreen display and primary display screen is illustrated. The gaming terminal can include a primary display screen 812, an inclined touchscreen display 830, and optionally a top secondary display screen 814. The illustrated screen arrangement provides another aspect where the upper or distal edge 832 of the touchscreen display is extended along an imaginary plane containing the viewing surface of the touchscreen display. The distal edge 832 of the inclined touchscreen display 830 is illustrated at a higher elevation than a lower edge 816 of the primary display screen 812. FIG. 8 also illustrates an aspect of a frontal ledge 840 where the touchscreen display is mounted to or rests on the ledge. The inclined touchscreen display can be slightly elevated above the main cabinet structure or, in some aspects, slightly elevated above another ledge-like protrusion from the front of the main cabinet. In some aspects, the front ledge 840 along with a mounted or resting touchscreen display 830 can also be lowered so that the distal edge 832 of the inclined touchscreen display 830 is at the same elevation as lower edge 816 or at some lower elevation than illustrated in FIG. 8. It is also contemplated that the frontal ledge 840 can be raised higher. This allows the gaming terminal to provide different accommodations to a player based on the player's preferences and to provide certain desirable adjustment features, such as the infinity-pool effect. FIG. 8 also illustrates an aspect of an input button 842 mounted to the frontal ledge 840 in a position adjacent to the touchscreen display 830. Furthermore, an exemplary support structure 850 for the touchscreen display is also illustrated.

Figure 9:
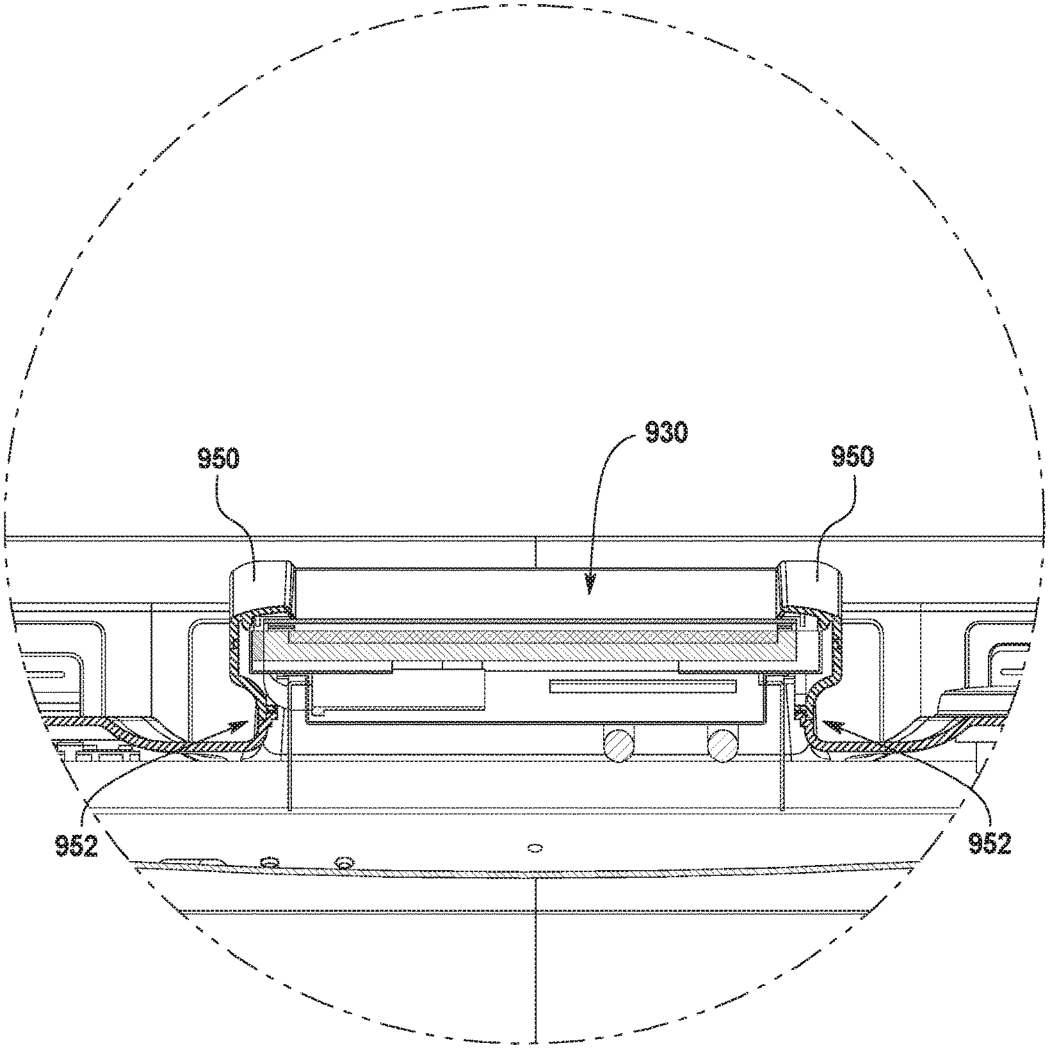
FIG. 9 is a front view of an exemplary inclined input display and support structure according to at least some aspects of the present invention.

Turning to FIG. 9, an exemplary front view of an inclined touchscreen display 930 and support structure 950 is illustrated. The inclined touchscreen display 930 may be mounted to or removably connected to a support structure 950 that forms a frame encompassing the touchscreen display. The support structure 950 may in turn be connected to or integral with the gaming terminal cabinet itself or a frontal ledge of the gaming cabinet. The support structure 950 can further form hand-hold recesses 952 adjacent to the respective left and right edges of the touchscreen display 930. In some aspects, the sides of the touchscreen display are cantilevered and the support structure provides a soft-touch surround molding to protect the touchscreen display and facilitate player handling and manipulation of the touchscreen display.

In some aspects, a gaming terminal 10 can include a game-logic circuitry having a central processing unit and one or more memory devices. The one or more memory devices can store instructions that, when executed by the central processing unit, cause the gaming terminal to transfer an object of the wagering game from a first display screen to a second display screen based on a speed and direction of a touch gesture received on the first display screen or to transfer an object from the second display screen to the first display screen.

Figure 10:
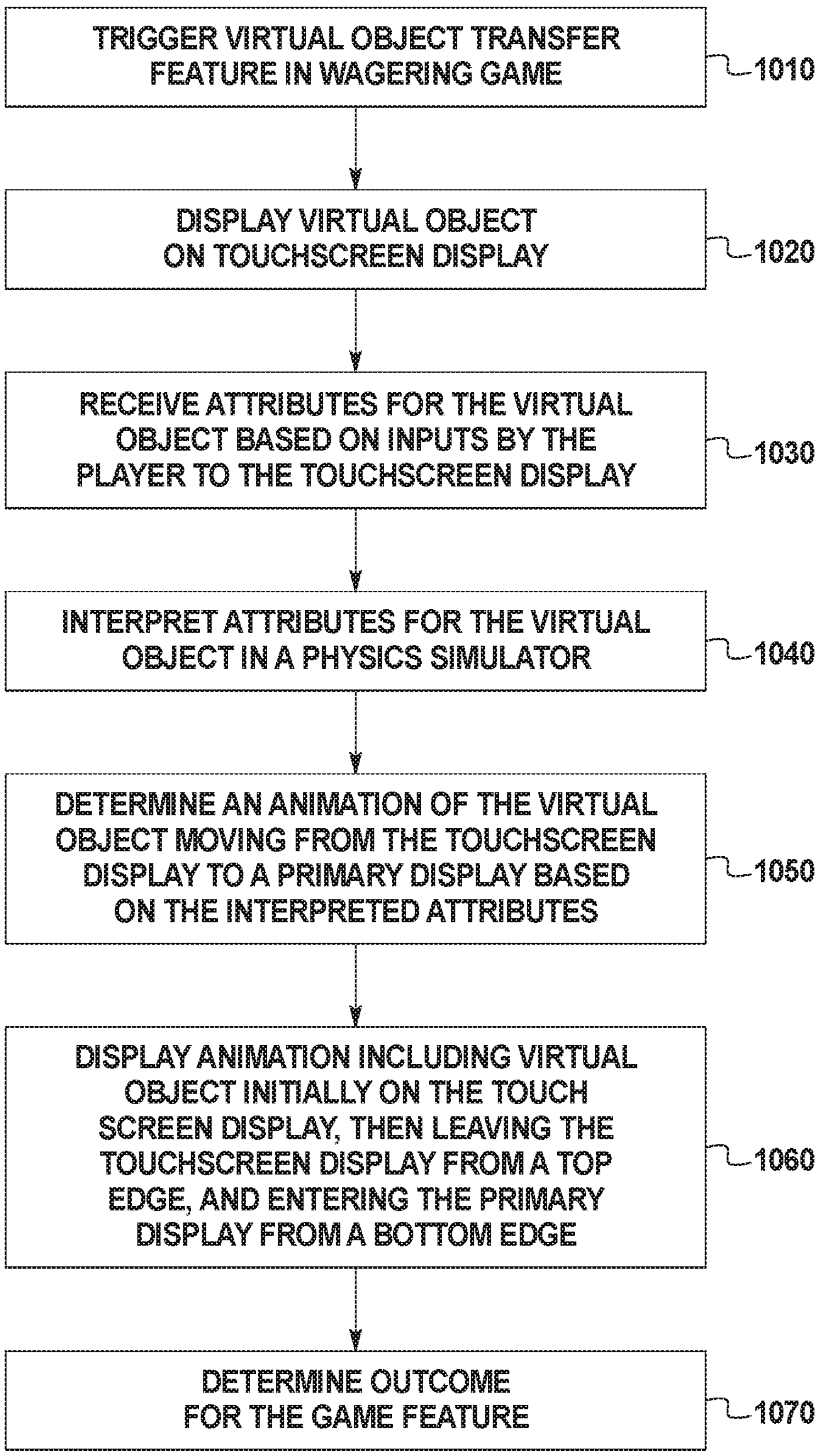
FIG. 10 is a flowchart for an algorithm that corresponds to instructions for a virtual object transfer feature executed by a controller in accord with at least some aspects of the disclosed concepts.

Referring now to FIG. 10, an exemplary flowchart is illustrated for an algorithm that corresponds to at least some instructions for a virtual object transfer feature in a wagering game that is executed by the CPU 30 in FIG. 2 in accord with at least some aspects of the disclosed concepts. The gaming terminal may include a primary or first display screen that is generally upright and has a lower section with a lower or proximal edge. The gaming terminal also includes an inclined touchscreen display have a distal or upper edge where in the incline is toward a player relative to horizontal so that that a player can view the display. The inclined touchscreen display can include a flat display that defines an imaginary plane that extends from the touchscreen display to intersect the lower section of the primary display screen. The wagering game begins with an input indicative of a wager to play the wagering game being received via one or more input devices. The one or more processors of the CPU 30 then execute at least some instructions that are now described in more detail. Beginning at step 1010, in response to a triggering event during the wagering game, the virtual object transfer event is initiated. The virtual object transfer event includes at least one virtual object that can be transferred from the touch screen display to the primary screen display or vice versa. At step 1020, the at least one virtual object is displayed on the inclined touchscreen display. The virtual object may be displayed at an initial or first position and may be at rest or it may be moving on the touchscreen display. At step 1030, one or more inputs indicative of movement attributes to be applied to the at least one virtual object are received via the inclined touchscreen display. The movement attributes are associated with a player's hand movement. Next, at step 1040, at least one of the one or more processors associated with the gaming terminal interpret the received movement attributes for the virtual object. The movements may or may not be interpreted and processed using a physics simulator. Then, at step 1050, an animation of the virtual object moving from the inclined touchscreen display to the primary display screen is determined. The animation is based at least in part on the received movement attributes from step 1030. At step 1060, the animation of the virtual object in motion is displayed on the inclined touchscreen display and the primary display screen and includes the virtual object being in motion from at least a second in-motion position just below the distal edge of the inclined touchscreen display to at least a third in-motion position just above the proximal edge of the primary display screen. In some aspects, the motion of the virtual object ends and the virtual object comes to rest on the primary display screen. It is contemplated that in certain aspects, the display of the animation on both the inclined touchscreen display and the primary display screen creates an infinity-pool effect when viewing the primary display screen relative to the inclined touchscreen display.

In some aspects of the virtual object transfer event, an outcome is determined for the event. The event may be a secondary target-type game where the outcome can be based on the player hitting a certain target with the virtual object. The event can also include other types of games including dice or card games. For example, a virtual object can be a die or dice, or the flipping or flicking of a card.

The inputs indicative of movement attributes that are received by the touchscreen display and interpreted by the processors can include attributes such as the speed and direction of a touch gesture by the player of the game on the touchscreen display. In some aspects, the inputs can be indicative of attributes including a distance and direction from the first position that are also received by a touch gesture associated with the player touch the touchscreen display.

The virtual object transfer event can include certain boundaries defined by the edges of the primary display screen and the touchscreen display. For example, the primary display screen can include a distal edge, a right edge, and a left edge defining virtual boundaries appearing to physically redirect the motion of an in-motion virtual object. The virtual object can then be continuously displayed on the primary display screen following initially being displayed on the primary display screen through being displayed at a final at-rest position. The inclined touchscreen display can also include a proximal edge, a right edge, and a left edge defining virtual boundaries appearing to also physically redirect the motion of an in-motion virtual object. The virtual object can then be continuously displayed on the inclined touchscreen display until immediately it exits from the top or distal edge of the touchscreen display to enter onto the primary display screen. Other boundary edge configurations are also contemplated that may confine and redirect the virtual object or allow it to pass from one screen to the next.

In some aspects, it is contemplated that a physics simulation algorithm may be applied based on the received inputs indicative of the movement attributes to be applied to the virtual object. For example, the applications of the physics simulator according to the movement attributes can be used to simulate the virtual object in motion along an arched trajectory. The simulation may not only include the speed and direction or distance and direction, but may also include an applied force and a simulation of gravitational forces acting on the virtual object moving from the inclined touchscreen display to the primary display screen, or vice versa.

It is contemplated that a desirable aspect of the present virtual object transfer event is to provide a realistic appearance of the transfer of objects from an inclined touchscreen to a primary display screen. FIGS. 11 and 12 detail some of these aspects including the cross display virtual object images landing on one display screen after being thrown or projected from the other screen, or vice versa. For example, a virtual object (e.g., dice, a bird) may be thrown from or projected from the inclined touchscreen display toward a target area on the primary display screen and would land in the primary display screen area based on a projected trajectory. The trajectory of the virtual object can be based on an angle and elevation of the input screen relative to the primary display screen. More detailed examples are now described below in the context of FIGS. 11A-11E and 12A-12C.

Figure 11A:
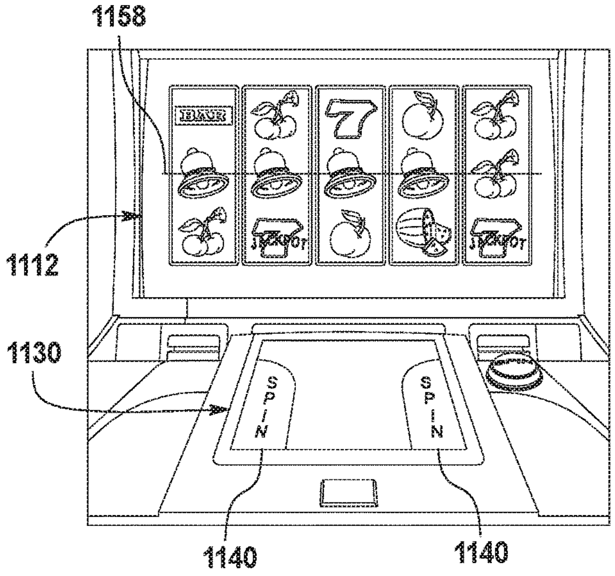
FIGS. 11A-11E illustrate an implementation of an exemplary virtual object transfer feature on an inclined input display and primary display screen of a gaming terminal according to at least some aspects of the present invention.
Figure 11B:
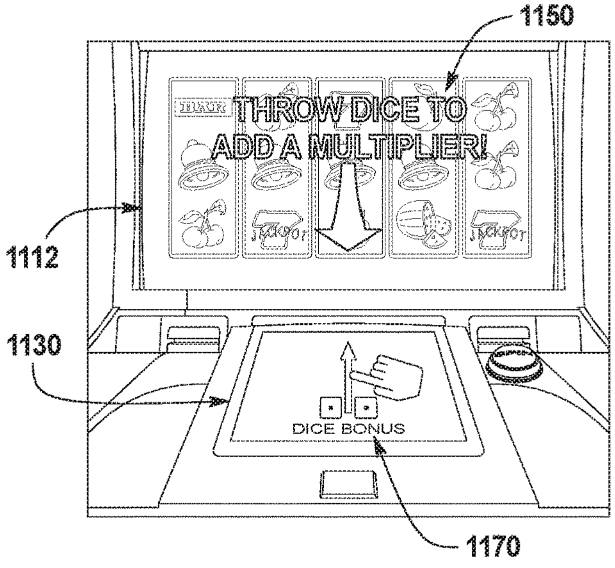
Figure 11C:
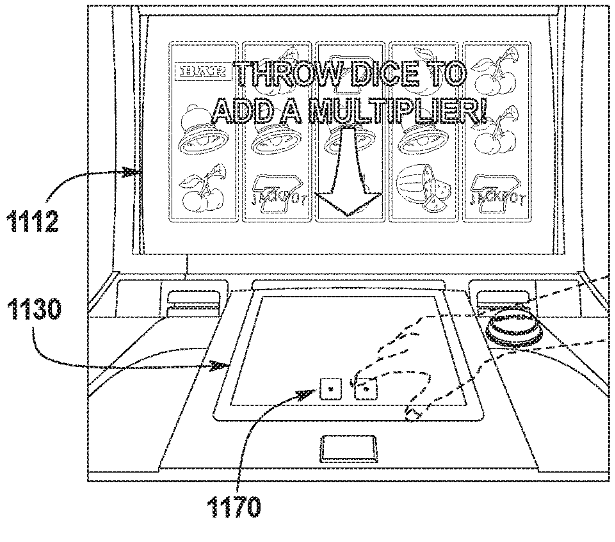
Figure 11D:
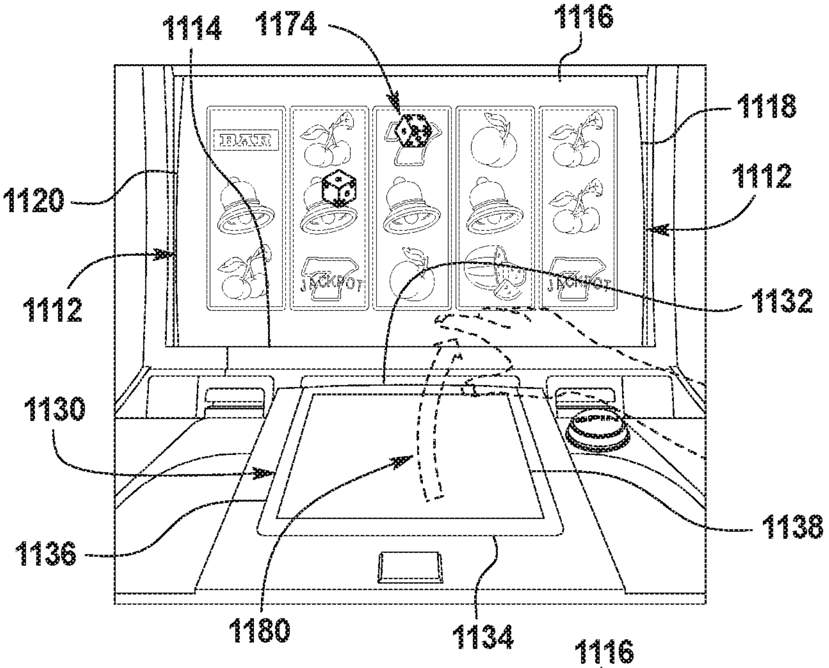

Turning now to FIGS. 11A-E, an aspect of an exemplary virtual object transfer feature on an input display 1130 and primary display screen 1112 of a gaming terminal is illustrated. In FIG. 11A, an exemplary slots wagering game is illustrated though any wagering game could be played. The player spins the reels of the slots game be selecting the spin button 1140 and in this particular example a winning outcome is achieved in the slots game along payline 1158. The winning outcome for this example is also a triggering event for a bonus game 1150 based on a virtual object transfer feature. Referring now to FIG. 11B, the bonus game is a dice bonus that determines a multiplier to be added to the winning outcome of the primary wagering game. The instructions to the player may be displayed on the primary display screen 1112 and the virtual object(s) 1170 are displayed on the inclined touchscreen display 1130 awaiting input indicative of a touch gesture from the player to provide movement attributes to the system to determine an animation for projecting the virtual object 1170 (e.g., the dice) from the inclined touchscreen display to the primary display screen. Referring now to FIG. 11C, the player's hand gesture(s) on the touchscreen display 1130 are applied to move the dice 1170. Then based on the speed and direction of the attributes determined from the hand gesture along with the physical attributes of the inclined display (e.g., incline angle, distance to primary display screen), an animation is generated of the dice 1170 being thrown from the inclined touchscreen display 1130 onto the primary display screen 1112. The player's hand gesture, or the inputs received based on the player hand gesture, can include the player dragging the dice 1170 around the touchscreen display 1130 in the general direction of the primary display screen and at the completion of the drag gesture determining the speed and direction of the gesture followed by projecting the dice when the player lifts their finger(s) from the touchscreen display. The player lifting their fingers ends the receipt of inputs and identifies the point at which the throw or projection of the virtual object 1170 toward the primary display screen is simulated. Referring now to FIG. 11D, the trajectory 1180 of the virtual object onto the primary display screen is illustrated. The dice are in motion at a new position 1174 with the direction and velocity of the virtual object corresponding to the direction and velocity of the player's hand gesture. The virtual object can be animated in a straight line from first display to second display along with rotational velocity that makes the virtual object appear to tumble. The virtual object can also have a trajectory if a portion of the attributes of the hand gesture are interpreted include input(s) associated with an upward motion.

Figure 11E:
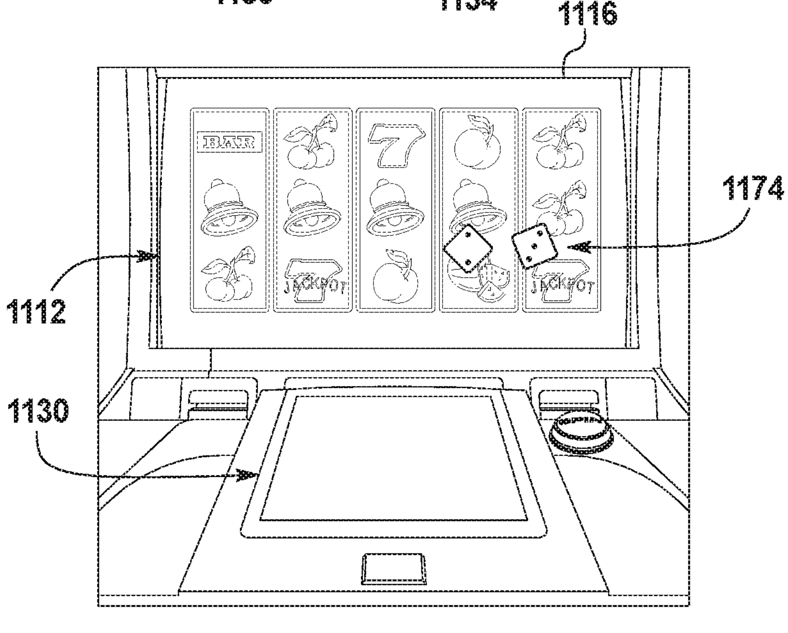
Figure 12A:
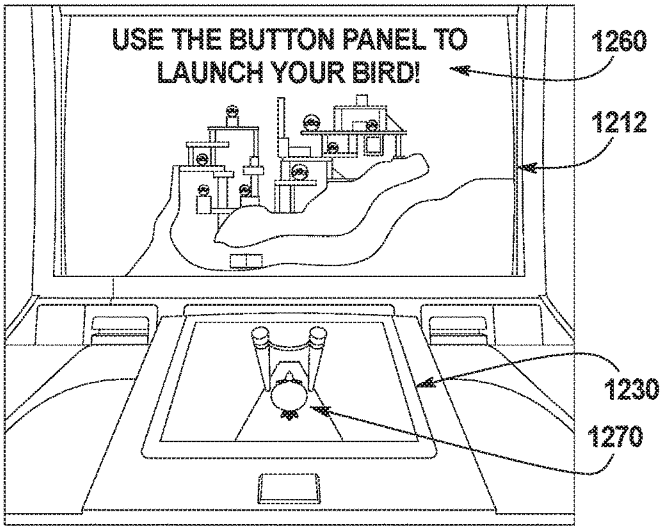
FIGS. 12A-12C illustrate an implementation of another exemplary virtual object transfer feature on an inclined input display and primary display screen of a gaming terminal according to at least some aspects of the present invention.
Figure 12B:
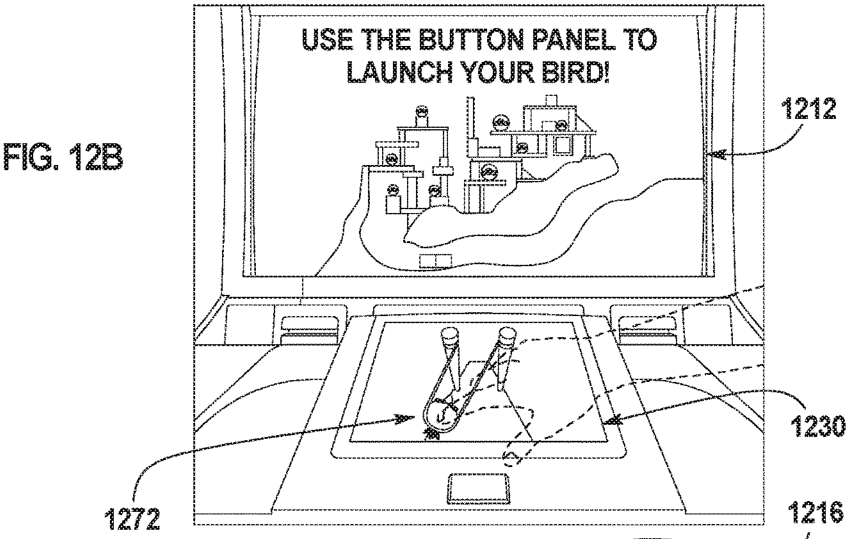
Figure 12C:
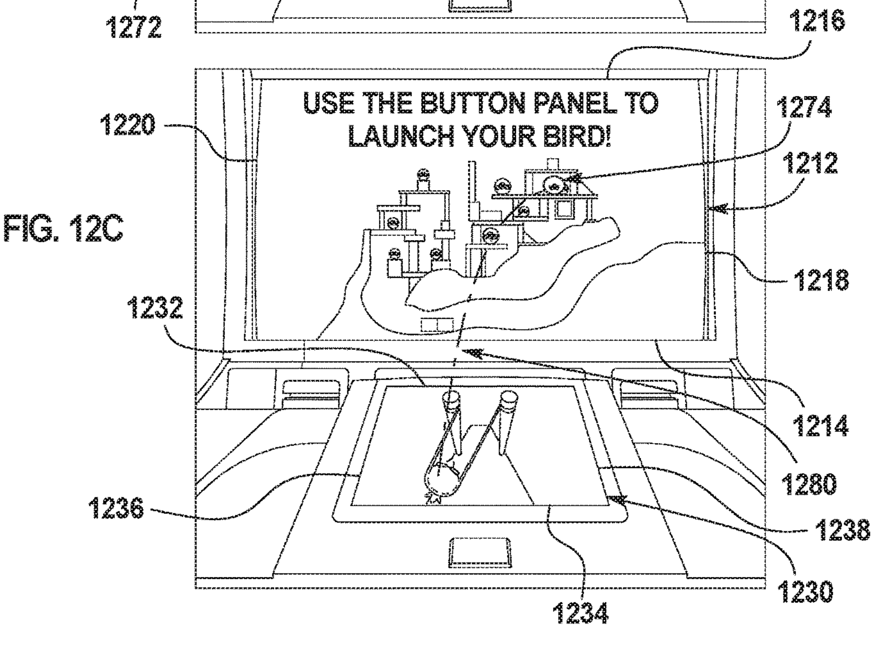

In some aspects, the virtual object can be confined and redirected by certain boundaries. For example, the dice in FIG. 11D are confined and redirected by top edge 1116, right edge 1118, and left edge 1120 of the primary display screen. Thus, based on the player's hand gesture, the dice may move from the touchscreen display to the primary display screen and strike one of the confining edges where the dice are then redirected to stay on the primary display screen. Similarly, the dice or virtual object are confined and redirected by lower edge 1134, right edge 1138, and left edge 1136 of touchscreen display 1130. Thus the only edges that may be traversed by the dice are top edge 1131 of the touchscreen display 1130 and the lower edge 1114 of the primary display screen 1112. Referring now to FIG. 11E, the virtual object 1174 gradually loses both directional and rotational velocity until it comes to a resting point on the primary display screen and shows a game outcome.

In some aspects of the virtual object transfer feature illustrated in FIGS. 11A-11E, the dice appear in a particular position or zone of the primary display screen based on simulating the physics of the dice throw and the various movement attributes received via the touchscreen display that are associated with the player's hand gesture. The area where the dice land would be confined to somewhere within the primary display area and the actual location would differ based on the speed and direction of the hand gesture. For example, a low speed hand gesture would place the dice just somewhere above the lower edge 1114 of primary display screen 1112 and a faster throw would place the dice toward the top edge 1116 of the primary display screen 1112. The dice may further be redirected after rebounding off the boundary created by the top edge and be redirected toward the bottom or lower edge of the primary display screen for a very fast throw of the dice. In some aspects, the speed is determined based on the distance and time period for the hand gesture traversing the input touchscreen display. The range of the dice throw as projected onto the primary display screen can be between an arched trajectory that may include simulating gravitational pull on the dice being thrown up the incline of the touchscreen display and landing toward the lower edge 1132 of the primary display screen 1112 to a straight line trajectory projecting the dice to rebound off the top edge 1116 of the primary display screen 1112.

Referring now to FIGS. 12A-C, another aspect of an exemplary virtual object transfer feature on an inclined touchscreen display 1230 and primary display screen 1212 of a gaming terminal is illustrated. FIG. 12A illustrates an exemplary bonus game 1260 that was initiated in response to a triggering event (e.g., elapsed period of playtime; bonus symbol, winning outcome) during a wagering game (e.g., slots game, card game, other wagering game). The bonus game 1260 is a target game where a player may receive an award based on hitting certain target with a slingshot. The instructions to the player may be displayed on the primary display screen 1212 with a virtual object 1270 (e.g., a bird) being displayed in an initial position on the inclined touchscreen display 1230. The home or initial position of virtual object 1270 then awaits input indicative of a touch gesture from the player to provide movement attributes to the input interface for determining an animation for projecting the virtual object 1270 from the touchscreen display 1230 to the primary display screen 1212. Referring now to FIG. 12B, the player's hand gesture(s) on the touchscreen display 1230 are applied and move the bird 1272 back a certain distance and direction on the touchscreen display 1230. Then based on the distance and direction just before the player removes their hand or finger from the touchscreen display, attributes or input parameters are determined. In some aspects, the attributes or input parameters for determining how to animate the projection of the virtual object are further based on physical attributes of the touchscreen display (e.g., incline angle, distance to primary display screen). Some or all of the attributes are then applied to generate an animation of the virtual object 1272 being projected by the slingshot from the touchscreen display 1230 onto the primary display screen 1212. The player's hand gesture—and the received inputs that are associated therewith—can include the player pulling the virtual object toward the lower edge 1234 of the touchscreen display 1230 and at the completion of the drag gesture (e.g., when the player lifts their finger from the touchscreen display) determining the distance and direction of the gesture as inputs for determining the projection of the virtual object toward the primary display screen. Referring now to FIG. 12C, the trajectory 1280 of the virtual object onto the primary display screen is illustrated. The bird is in motion and strikes a target at position 1274 with the direction and velocity of the virtual object (e.g., the flying bird) corresponding to the direction and distance of the player's hand gesture while pulling the bird back in the sling. The virtual object can be animated in a straight line or along an arched trajectory from inclined touchscreen display 1230 to the primary display screen 1212.

In some aspects, the virtual object can be confined and redirected by certain boundaries. For example, the bird in FIG. 12C can be confined and redirected by top edge 1216, right edge 1218, and left edge 1220 of the primary display screen 1212. Similarly, the virtual object can be confined and redirected by lower edge 1234, right edge 1238, and left edge 1236 of touchscreen display 1230. However, in some aspects, it is contemplated that the bird or virtual object is allowed to fly or have a trajectory that goes beyond the boundaries defined by the primary display screen 1212. In addition, other boundaries or simulated barrier may be present within the primary display screen including animated physical objects such as buildings, the ground, moving objects, or other simulated physical objects. The virtual object can collide with either the barriers or with targets to determine a game outcome. In some aspects, the virtual object may gradually lose its velocity until coming to a resting point defined by the physical barrier (e.g., target, ground, building). It is further contemplated that if the virtual object is projected at a very high trajectory, the virtual object may extend above the top edge 1216 and off the primary display screen 1212 and then return on its simulated descent.

In some aspects of the present disclosure it can be desirable for an input interface (e.g., touchscreens 430, 530, 630, 830, 930, 1130, 1230) to include an auto-scale or auto-calibrate feature that is based on the attributes received by the interface through a hand plant by the user of the gaming terminal. The player's hand plant can provide the gaming system information on the player's rough ergonomic size and the player's thumb-to-finger reach. The received physical attributes for the player can then be interpreted and applied to scale the input display interface or to select an appropriate preconfigured interface size (e.g., small, medium, large) based on the received player attribute(s). For example, when a player sits down at a gaming terminal, an initial instruction can be displayed on one of the display screens or on the input interface requesting the player to place one or both of their hands on the input display interface. After the gaming terminal receives and interprets the player hand attributes through the input interface, the system can then calibrate or customize the interface to individualize the player experience.

In some aspects of the present disclosure a player can be provided with options to adjust or move frequently used buttons to different locations on the input interface. This feature can be desirable to minimize or alleviate fatigue from repetitive motion. For example, one or both of the spin button 1140 displayed in the bottom right and bottom left corners of the input display screen 1130 in FIG. 11 could be moved to the top right or top left of the display screen or elsewhere on the screen. It is also contemplated that the adjustment options can include providing the player a choice between providing select inputs (e.g., spin reels input) through a button displayed on the input display screen or through another input device, such as an electromechanical button placed elsewhere on cabinet near or adjacent to the input display screen.

It is further contemplated that an input display screen for a gaming terminal can be customized to individual player characteristics by first determining a player's preferred placement of their hand and accordingly adjusting gaming content. The gaming terminal may initially receive an input through the input display screen of attributes of the player's hand in response to the player placing their hand in a preferred position on the input display screen. In some aspects, the input display screen is clear or practically clear without buttons or other objects being displayed that might bias a player's decision of where to place their hand. It is also contemplated that the input display screen for a gaming terminal can be customized to individual player characteristics through information received from over a network and outside of a gaming system. For example, characteristic information may be received by the gaming system that is associated with a player and that information may be used to customize an input display screen according to attributes of an individual player. The characteristic information may be stored or collected through a server associated with website that collects physical player attributes, such as preferred hand placement for a touchscreen. The website may be used to collect information from a player based on game or exercise application executed by the player on a tablet device and based on that information the player characteristic information is then stored and interpreted to determine a preferred layout for later use on an input display screen for the gaming terminal. The player characteristic information (e.g., hand sizing information) is saved on a server or other networked storage device that can send or allow access by the gaming system to retrieve the relevant or desired player characteristics.

It is also contemplated that a touchscreen display, such as the ones described throughout this disclosure, can include an aspect where new user buttons or different button layouts are provided on the display screen as a reward for certain achievements during game play. The addition of new user buttons or the provision of different button layouts can also be time based, which can be a desirable aspect for allowing new players to gradually learn the new input interface and not feel overwhelmed by an immediate introduction of many new buttons on the input display screen until a certain time period is achieved. In addition, infographics such as credit meters or other game state specific data typically presented on the primary display can be displayed on the touchscreen display in addition to or instead of the primary display. For example, credit meter data can be displayed on the touch-screen display instead of the primary display thus allowing the data to be displayed for the ease of concealment by the player's hand for privacy.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming terminal, comprising:

a game display screen operative to display a wagering game;

a frontal ledge extending forwardly from the game display screen towards a player position in front of the gaming terminal;

a push-button mounted to the frontal ledge and operative to receive inputs to play the wagering game; and an input interface screen operative to display images of input buttons and including a touchscreen operative to receive inputs at the input buttons to play the wagering game, the input interface screen positioned on the frontal ledge and adjacent to the push-button, the input interface screen at least partially elevated above the frontal ledge and the push-button by a support structure, the input interface screen including opposing proximal and distal edges, the proximal edge being closer than the distal edge to the player position in front of the gaming temlinal, the input interface screen positioned relative to the game display screen such that the distal edge is horizontally and physically spaced from a lower section of the game display screen by an offset distance.

2. The gaming terminal of claim 1, wherein the input interface screen has a surface area that is less than or equal to forty percent of a surface area of the game display screen.

3. The gaming terminal of claim 1, wherein the support structure forms a frame encompassing the input interface screen.

4. The gaming terminal of claim 1, wherein the support structure forms hand-holds adjacent to respective opposite sides of the input interface screen.

5. The gaming terminal of claim 1, wherein the input interface screen is removably connected to the support structure.

6. The gaming terminal of claim 1, further including game-logic circuitry having a central processing unit and one or more memory devices, the one or more memory devices storing instructions that, when executed by the central processing unit, cause the gaming terminal to transfer a virtual object of the wagering game from the input interface screen to the game display screen based on a speed and direction of a touch gesture received on the input interface screen.

7. The gaming terminal of claim 1, wherein the input interface screen is inclined upwardly relative to horizontal, from the proximal edge to the distal edge, such that an imaginary plane containing the input interface screen intersects the lower section of the game display screen.

8. The gaming terminal of claim 1, wherein the input interface screen is inclined upwardly relative to horizontal, from the proximal edge to the distal edge, such that the distal edge, but not the proximal edge, is elevated relative to the push-button.

9. The gaming terminal of claim 1, wherein the frontal ledge is positioned below a height of the game display screen.

10. The gaming terminal of claim 1, further including a cabinet that houses the game display screen, the frontal ledge extending from cabinet.

11. A gaming terminal, comprising:

a cabinet;

a game display screen housed within the cabinet and operative to display a wagering game;

a frontal ledge positioned below a height of the game display screen and extending forwardly from the cabinet towards a player position in front of the gaming terminal;

a push-button mounted to the frontal ledge and operative to receive inputs to play the wagering game; and an input interface screen operative to display images of input buttons and including a touchscreen operative to receive inputs at the input buttons to play the wagering game, the input interface screen positioned on the frontal ledge and adjacent to the push-button, the input interface screen including opposing proximal and distal edges, the proximal edge being closer than the distal edge to the player position in front of the gaming terminal, the input interface screen being inclined upwardly relative to horizontal, from the proximal edge to the distal edge, such that the distal edge, but not the proximal edge, is elevated relative to the push-button.

12. The gaming terminal of claim 11, wherein the input interface screen has a surface area that is less than or equal to forty percent of a surface area of the game display screen.

13. The gaming terminal of claim 11, wherein the support structure forms a frame encompassing the input interface screen.

14. The gaming terminal of claim 11, wherein the support structure forms hand-holds adjacent to respective opposite sides of the input interface screen.

15. The gaming terminal of claim 11, wherein the input interface screen is removably connected to the support structure.

16. The gaming terminal of claim 11, further including game-logic circuitry having a central processing unit and one or more memory devices, the one or more memory devices storing instructions that, when executed by the central processing unit, cause the gaming terminal to transfer a virtual object of the wagering game from the input interface screen to the game display screen based on a speed and direction of a touch gesture received on the input interface screen.

17. The gaming terminal of claim 11, wherein the input interface screen is inclined upwardly relative to horizontal, from the proximal edge to the distal edge, such that an imaginary plane containing the input interface screen intersects the lower section of the game display screen.

18. The gaming terminal of claim 11, wherein the input interface screen is positioned relative to the game display screen such that the distal edge is horizontally and physically spaced from a lower section of the game display screen by an offset distance.

19. A gaming terminal, comprising:

a game display screen operative to display a wagering game;

a frontal ledge extending forwardly from the game display screen towards a player position in front of the gaming terminal;

a push-button mounted to the frontal ledge and operative to receive inputs to play the wagering game; and an input interface screen operative to display images of input buttons and including a touchscreen operative to receive inputs at the input buttons to play the wagering game, the input interface screen being adjacent to the push-button, the input interface screen including opposing proximal and distal edges, the proximal edge being closer than the distal edge to the player position in front of the gaming terminal, the input interface screen supported on the frontal ledge at an acute angle therewith such that the distal edge, but not the proximal edge, is elevated relative to the push-button, the push-button being adjacent to the support structure.

20. The gaming terminal of claim 1, wherein the acute angle is in a range of 9 to 40 degrees.

* * * * *